United States Patent [19]

Rasshofer et al.

[11] 4,368,278

[45] Jan. 11, 1983

[54] PROCESS FOR THE PRODUCTION OF POLYURETHANES USING CYCLIC N-HYDROXYALKYL-SUBSTITUTED COMPOUNDS CONTAINING AMIDINE GROUPS AS CATALYSTS

[75] Inventors: Werner Rasshofer, Cologne; Gerhard Grögler, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 251,011

[22] Filed: Apr. 3, 1981

[30] Foreign Application Priority Data

Apr. 22, 1980 [DE] Fed. Rep. of Germany ....... 3015440

[51] Int. Cl.$^3$ ............................................. C08G 18/14
[52] U.S. Cl. .................................... 521/115; 521/118; 528/49
[58] Field of Search ................... 521/115, 118; 528/49

[56] References Cited

U.S. PATENT DOCUMENTS

| | | | |
|---|---|---|---|
| 3,050,475 | 8/1962 | Müller et al. | 521/118 |
| 3,448,065 | 6/1969 | Green | 521/118 |
| 3,674,721 | 7/1972 | Aufdermarsh et al. | 260/2.5 AC |
| 3,806,475 | 4/1974 | Narayan et al. | 521/118 |
| 4,049,931 | 9/1977 | Sandner et al. | 260/2.5 AC |
| 4,115,320 | 9/1978 | Meyborg | 252/431 |
| 4,150,212 | 9/1978 | Meyborg | 252/431 |

FOREIGN PATENT DOCUMENTS

| | | |
|---|---|---|
| 2737671 | 2/1979 | Fed. Rep. of Germany . |
| 1153308 | 5/1969 | United Kingdom . |
| 1379985 | 1/1975 | United Kingdom . |
| 1182014 | 2/1978 | United Kingdom . |

OTHER PUBLICATIONS

Catalysis in Isocyanate Reactions by Frisch & Rennao J. Macromol Chem. Soc. C 5 (1) 103–150–1970.

Primary Examiner—Maurice J. Welsh
Attorney, Agent, or Firm—Gene Harsh; Joseph C. Gil; Lyndanne M. Whalen

[57] ABSTRACT

A polyurethane is made by reacting a polyisocyanate with a compound having at least two isocyanate-reactive hydrogen atoms and having a molecular weight of from 400 to 10,000 in the presence of a catalyst. The catalyst employed is a cyclic N-hydroxyalkyl-substituted compound containing an amidine group. Polyurethanes made in accordance with this process are useful as shoe soles, upholstery material, sound insulating materials, coating compositions, packaging materials and mattresses.

10 Claims, No Drawings

PROCESS FOR THE PRODUCTION OF POLYURETHANES USING CYCLIC N-HYDROXYALKYL-SUBSTITUTED COMPOUNDS CONTAINING AMIDINE GROUPS AS CATALYSTS

BACKGROUND OF THE INVENTION

This invention relates to a process for the production of polyurethane plastics in which N-hydroxyalkylsubstituted cyclic compounds containing amidine groups are used as catalysts.

Many amines are effective catalysts for addition reactions of polyols with isocyanates (cf. K. C. Frisch, L. P. Rennao, "Catalysis in Isocyanate Reactions", in J. Macromol. Sci. —Revs. Macromol. Chem. Soc C 5 (1), 103–150). The most active amines which generally contain tertiary nitrogen (for example, 1,4-diazabicyclo-(2,2,2)-octane), must be used in amounts of from 0.04 to 0.5 parts by weight (based on the polyol used). Other less reactive amines must be used in considerably larger quantities.

Even small quantities of amine catalysts, however, give rise to serious disadvantages. Since the amines are generally tertiary amines which cannot be incorporated in the polyurethane product, a noxious odor persists for some time after production. Such an odor is particularly undesirable when everyday articles such as upholstery materials, fittings for motor vehicles, shoes, furniture, etc. are being made. These amines are also frequently responsible for the yellowing of light-colored leather or plastics surfaces.

Another disadvantage of amine catalysts which are not incorporated in the product polyurethane is that they may exude or be transported to the surface by other physical and/or chemical processes. For example, a polyurethane material catalyzed with diazabicycloundecene of the type used for the production of steering wheels and headrests, may become covered by a white coating in which diazabicycloundecene is found. Similarly, in cases where triethylene diamine (Dabco$^{(R)}$) is used as catalyst in the production of polyurethane shoe soles, discoloration is frequently observed to affect light-colored upper leathers, making it impossible to foam the sole directly onto the upper. This discoloration is caused by triethylene diamine escaping during the foaming process. A similar effect is observed in cases where non-incorporable tetrahydropyrimidines are used as catalysts.

German Offenlegungsschrift No. 1,950,262 describes amidines as catalysts in the production of polyurethanes from aliphatic isocyanates. German Offenlegungsschrift No. 2,737,671 describes the use of cyclic amidines having tetrahydropyrimidine or imidazoline structures as catalysts for the production of polyurethanes. Bicyclic amidines as polyurethane catalysts are described in German Offenlegungsschrift No. 1,745,418.

German Offenlegungsschrift No. 2,601,082 describes the production of polyurethanes using incorporable catalysts of the amidine type. However, the aminopyridines disclosed therein show sufficient activity only for the production of polyurethanes from aromatic polyisocyanates. The catalytic activity of these aminopyridines is inadequate for the production of polyurethanes from aliphatic polyisocyanates. Therefore, the aminopyridines previously used as catalysts in the production of polyurethanes have often been inadequate for practical applications.

SUMMARY OF THE INVENTION

It is an object of the present invention to provide a process for the production of polyurethanes which employs a catalyst that does not impart a noticeable amine odor to the polyurethane product.

It is another object of the present invention to provide a process for the production of polyurethanes which employs a catalyst that is useful in producing a polyurethane from aliphatic and aromatic polyisocyanates.

It is a further object of the present invention to provide a process for the production of polyurethanes which employs a catalyst that has an anti-hydrolysis effect upon the polyurethane product.

These and other objects which will be apparent to those in the art are accomplished by a process in which a polyisocyanate and isocyanate-reactive compound are reacted in the presence of a catalyst. The catalyst is a cyclic-N-hydroxyalkyl-substituted compound containing an amidine group. The isocyanate-reactive compound contains at least two isocyanate-reactive hydrogen atoms and has a molecular weight of from 400 to 10,000.

DETAILED DESCRIPTION OF THE INVENTION

The present invention relates to a process for the production of polyurethane plastics in which a polyisocyanate is reacted with a compound containing at least two isocyanate-reactive hydrogen atoms and having a molecular weight of from 400 to 10,000 in the presence of a catalyst containing amidine groups. The catalyst employed is a cyclic-N-hydroxyalkyl-substituted compound containing an amidine group. A compound containing at least two isocyanate-reactive hydrogen atoms and having a molecular weight of from 32 to 400 may also be used as a chain-extending agent.

In the present invention, the preferred catalysts are compounds corresponding to the general formula:

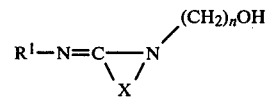

wherein, $R^1$ represents hydrogen, $C_1$–$C_{12}$ alkyl or $C_6$–$C_{10}$ aryl;

n represents an integer of from 1 to 6; and

X represents a divalent radical (optionally containing heteroatoms), preferably the group:

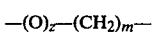

wherein, m represents an integer of from 2 to 6, and z represents 0 or 1.

Other catalysts suitable to the present invention correspond to the general formula:

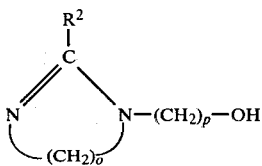

wherein $R^2$ represents hydrogen, $C_1$–$C_{12}$ alkyl or $C_6$–$C_{10}$ aryl; and o and p each independently represents an integer of from 1 to 6.

Additional catalysts which may be used in the process of the present invention correspond to the general formula:

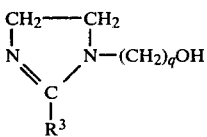

wherein $R^3$ represents hydrogen, $C_1$–$C_{12}$ alkyl or $C_6$–$C_{10}$ aryl; and q represents an integer of from 1 to 6.

Particularly preferred catalysts are 2-phenylimino-3-(2-hydroxyethyl)-oxazolidine corresponding to the following formula:

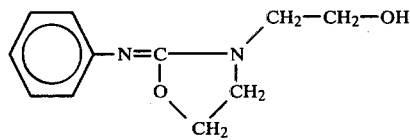

N-(2-hydroxyethyl)-2-methyl tetrahydropyrimidine corresponding to the following formula:

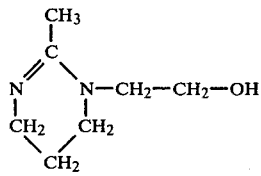

and

N-(2-hydroxyethyl) imidazoline corresponding to the following formula:

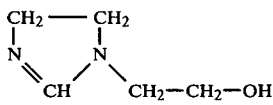

The catalysts which may be used in the present invention are known compounds of the amidine type which contain an incorporable hydroxyalkyl group on the N-atom that is not attached to a double bond. This N-atom forms part of a ring.

In general, the catalysts which may be used in accordance with the present invention are homogeneously soluble in the compound containing at least two reactive hydrogen atoms and having a molecular weight of from 400 to 10,000, (such as polyols used in the production of polyurethane plastics). However, it is also possible to use catalysts in dispersed or finely divided form.

The cyclic, N-hydroxyalkyl-substituted catalyst containing amidine groups should generally be used in quantities of from 0.001 to 5% by weight, preferably from 0.05 to 2% by weight (based on the compounds containing at least two active hydrogen atoms and having a molecular weight of from 400 to 10,000).

Aliphatic, cycloaliphatic, araliphatic, aromatic and heterocyclic polyisocyanates may be used in the process of the present invention. Examples of suitable polyisocyanates are described by W. Siefken in Justus Liebigs Annalen der Chemie, 562 pages 75 to 136. Among the polyisocyanates described therein are those corresponding to the general formula:

$$Q(NCO)_n$$

wherein n represents 2–4, preferably 2; and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms; or an araliphatic hydrocarbon radical containing from 8 to 15 (preferably from 8 to 13) carbon atoms.

Examples of compounds corresponding to this formula are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; 1-isocyanato-3,3,5-trimethyl-5-isocyanatomethyl cyclohexane (German Auslegeschrift No. 1,202,785, U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

Other examples of suitable polyisocyanates are: triphenyl methane-4,4',4"-triisocyanate; polyphenyl polymethylene polyisocyanates of the type obtained by condensing aniline with formaldehyde followed by phosgenation (described in British Pat. Nos. 874,430 and 848,671); m- and p-isocyanatophenyl sulfonyl isocyanates (U.S. Pat. No. 3,454,606); perchlorinated aryl polyisocyanates (German Auslegeschrift No. 1,157,601; U.S. Pat. No. 3,277,138); polyisocyanates containing carbodiimide groups (German Pat. No. 1,092,007 (U.S. Pat. No. 3,152,162) and German Offenlegungsschriften Nos. 2,504,400; 2,537,685 and 2,552,350)); norbornane diisocyanates (U.S. Pat. No. 3,492,330); polyisocyanates containing allophanate groups (British Pat. No. 994,890, Belgian Pat. No. 761,626 and Dutch Patent Application No. 7,102,524); polyisocyanates containing isocyanurate groups (U.S. Pat. No. 3,001,973); German Pat. Nos. 1,022,789; 1,222,067 and 1,027,394 and German Offenlegungsschriften Nos. 1,929,034 and 2,004,048): polyisocyanates containing urethane groups (Belgian Pat. No. 752,261, U.S. Pat. No. 3,394,164 and 3,644,457); polyisocyanates containing acylated urea groups (German Pat. No. 1,230,778); polyisocyanates containing biuret groups (U.S. Pat. Nos. 3,124,605 and 3,201,372; British Pat. No. 889,050); polyisocyanates produced by telomerization reactions (U.S. Pat. Nos. 3,654,106); polyisocyanates containing ester groups (British Pat. Nos. 965,474 and 1,072,956, U.S. Pat. Nos. 3,567,763 and German Pat. No. 1,231,688); reaction products of the above-mentioned diisocyanates with acetals (German Pat. No. 1,072,385) and polyisocyanates containing polymeric fatty acid esters (U.S. Pat. No. 3,455,883). It is also possible to use the isocyanate group-containing distillation residues obtained in the commercial production of isocyanates, optionally in solution in one or more of the above-mentioned polyisocyanates. It is also possible to use mixtures of the above-mentioned polyisocyanates.

It is generally preferred that the commercially readily available polyisocyanates be used in the present invention. Such readily available materials include 2,4-and 2,6-tolylene diisocyanate, also mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates"). Particularly preferred materials are modified polyisocyanates of the type derived from 2,4- and/or 2,6-tolylene diisocyanate or from 4,4' and/or 2,4'-diphenyl methane diisocyanate.

Compounds containing at least two isocyanate-reactive hydrogen atoms and generally having a molecular weight of from 400 to 10,000 which may be used in the present invention contain amino groups, thiol groups, carboxyl groups and hydroxyl groups. Preferably these compounds contain hydroxyl groups, with compounds containing from 2 to 8 hydroxyl groups and having molecular weights of from 500 to 8,000, (most preferably from 1000 to 6000), being particularly suitable. Such preferred compounds include polyesters, polyethers, polythioethers, polyacetals, polycarbonates and polyester amides containing at least 2, preferably from 2 to 8, most preferably from 2 to 4, hydroxyl groups used in the production of non-cellular and cellular polyurethanes.

Polyesters containing hydroxyl groups suitable to the present invention are reaction products of polyhydric (preferably dihydric) alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof to produce the polyesters. The polycarboxylic acids may be aliphatic, cycloaliphatic, aromatic and/or heterocyclic and may optionally be substituted (for example by halogen atoms) and/or may be unsaturated.

Examples of suitable carboxylic acids and derivatives thereof are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimerized and trimerized unsaturated fatty acids (optionally in admixture with monomeric unsaturated fatty acids, such as oleic acid), terephthalic acid dimethyl ester and terephthalic acid-bis-glycol ester. Suitable polyhydric alcohols include: ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, 1,2,4-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols. The polyesters may contain terminal carboxyl groups. Polyesters of lactones (for example ε-caprolactone) or of hydroxy carboxylic acids (for example ω-hydroxy caproic acid) may also be used.

The polyethers containing at least 2 (generally from 2 to 8), preferably 2 or 3 hydroxyl groups suitable for use in accordance with the present invention are known to those in the art. These polyethers may be obtained by polymerizing epoxides, such as ethylene oxide, propylene oxide, butylene oxide, tetrahydrofuran, styrene oxide or epichlorohydrin in the presence of Lewis catalysts, such as $BF_3$. Polymerization may also be accomplished by the addition of epoxides (preferably ethylene oxide and propylene oxide) either in admixture or successively, to compounds containing reactive hydrogen atoms such as water, ammonia, alcohols or amines. Examples of such reactive hydrogen-containing compounds are ethylene glycol, 1,3-propylene glycol, 1,2-propylene glycol, trimethylol propane, glycerol, sorbitol, 4,4'-dihydroxy diphenyl propane, aniline, ethanolamine and ethylene diamine. Sucrose polyethers of the type described in German Auslegeschriften Nos. 1,176,358 and 1,064,938 and formitol or formose-started polyethers (German Offenlegungsschriften Nos. 2,639,083 and 2,737,951) may also be used in accordance with the present invention. In many cases, it is preferred to use polyethers which contain predominantly primary OH-groups (up to 90% by weight, based on all the OH-groups present in the polyether). Polybutadienes containing OH-groups are also suitable to the present invention.

Among the polythioethers which may be employed as the high molecular weight isocyanate reactive compounds, the condensation products of thiodiglycol on its own and/or with other glycols, dicarboxylic acids, formaldehyde, aminocarboxylic acids or amino alcohols are preferred. These condensation products include polythio mixed ethers, polythioether esters or polythioether ester amides.

Polyacetals which may be used in the present invention include the compounds obtained by reacting glycols (such as diethylene glycol, triethylene glycol, 4,4'-dioxethoxy diphenyl dimethyl methane and hexane diol) with formaldehyde. Other polyacetals suitable to the present invention may be obtained by polymerizing cyclic acetals, such as trioxane (German Offenlegungsschrift No. 1,694,128).

Suitable polycarbonates containing hydroxyl groups are known to those in the art. Such polycarbonates may be obtained by reacting diols (such as 1,3-propane diol, 1,4-butane diol and/or 1,6-hexane diol, diethylene glycol, triethylene glycol, tetraethylene glycol or thiodiglycol) with diaryl carbonates (for example diphenyl carbonate) or with phosgene (German Auslegeschriften Nos. 1,694,080; 1,915,908 and 2,221,751; German Offenlegungsschrift No. 2,605,024).

The polyester amides and polyamides suitable to the present invention include the predominantly linear condensates obtained from polybasic carboxylic acids or anhydrides thereof and polyhydric amino alcohols, diamines, higher polyamines and mixtures thereof.

Polyhydroxyl compounds containing urethane or urea groups, optionally modified natural polyols (such as castor oil), and carbohydrates (for example starch), may also be used as the isocyanate reactive compound of the present invention. Addition products of alkylene oxides with phenol/formaldehyde resins or with urea/formaldehyde resins may also be used.

Before they are used in the polyisocyanate-polyaddition process, the above-mentioned polyhydroxyl compounds may be modified in various ways. One such modification (described in German Offenlegungsschriften Nos. 2,210,839 (U.S. Pat. No. 3,849,515) and 2,544,195) is accomplished by etherification of a mixture of different polyhydroxyl compounds (for example, a polyether polyol and a polyester polyol) in the presence of a strong acid to form a relatively high molecular weight polyol which is made up of different segments attached through ether bridges. Amide groups may be introduced into the polyhydroxyl compounds by the procedure disclosed in German Offenlegungsschrift No. 2,559,372. Triazine groups may be introduced in the polyhydroxyl compounds by reacting the polyhydroxyl compounds with polyfunctional cyanic acid esters (German Offenlegungsschrift No. 2,620,487). The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamide or acyl urea groups (German Offenlegungsschriften Nos. 2,714,289; 2,714,292 and 2,714,293). In some cases, it may be particularly advantageous to convert the relatively high molecular weight polyhydroxyl compounds (either partially or completely) into the corresponding anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. These procedures produce relatively high molecular weight compounds containing terminal aromatic amino groups. German Offenlegungsschrift No. 2,546,536 and U.S. Pat. No. 3,865,791 disclose methods for producing relatively high molecular weight compounds containing terminal amino groups in which NCO prepolymers are reacted with enamines, aldimines, or ketimines containing hydroxyl groups and then hydrolyzed. Other processes for producing relatively high molecular weight compounds containing terminal amino groups or hydrazide groups are described in German Offenlegungsschrift No. 1,694,152 (U.S. Pat. No. 3,625,871).

According to the present invention, it is also possible to use polyhydroxyl compounds containing high molecular weight polyadducts and polycondensates or polymers in finely dispersed or dissolved form. Such polyhydroxyl compounds may be obtained by polyaddition reactions (for example, reactions between polyisocyanates and aminofunctional compounds), and polycondensation reactions (for example, between formaldehyde and phenols and/or amines) in situ in the above-mentioned compounds containing hydroxyl groups. Such processes are described in German Auslegeschriften Nos. 1,168,075; 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible to obtain such a polyhydroxyl compound by mixing an aqueous polymer dispersion with a polyhydroxyl compound and subsequently removing the water from the mixture (U.S. Pat. No. 3,869,413 or German Offenlegungsschrift No. 2,550,860).

Polyhydroxyl compounds modified by vinyl polymers obtained by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795; U.S. Pat. No. 3,637,909) are also suitable for use in the process according to the present invention. Plastics having particularly good flameproof properties are obtained by using polyether polyols modified by graft polymerization with vinyl phosphonic acid esters and, optionally, (meth-)acrylonitrile, (meth-)acrylamide or OH-functional (meth-)acrylic acid esters (German Offenlegungsschriften Nos. 2,442,101; 2,644,922 and 2,646,141). Polyhydroxyl compounds into which carboxyl groups have been introduced by radical graft polymerization with unsaturated carboxylic acids and, optionally, other olefinically unsaturated monomers (German Offenlegungsschriften Nos. 2,714,291; 2,739,620 and 2,654,746) are particularly advantageous when used in combination with mineral fillers.

Where modified polyhydroxyl compounds of the type mentioned above are used as starting components in the polyisocyanate-polyaddition process, polyurethanes having considerably improved mechanical properties are generally obtained.

Representatives of the above-mentioned isocyanate-reactive compounds suitable to the present invention are described in High Polymers, Vol. XVI, "Polyurethane, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunstoff-Handbuch, Vol. VII, Vieweg-Hochtlen, Carl Hanser-Verlag, Munich, 1966, for example on pages 45 to 71. It is, of course, possible to use mixtures of the above-mentioned compounds containing at least two isocyanate-reactive hydrogen atoms and having a molecular weight of from 400 to 10,000 (for example, mixtures of polyethers and polyesters). In some cases, it is particularly advantageous to combine low-melting and high-melting polyhydroxyl compounds (German Offenlegungsschrift No. 2,706,297).

Compounds containing at least two isocyanate-reactive hydrogen atoms and having a molecular weight of from 32 to 400 may be used in the present invention as chain-extenders or cross-linkers. These compounds may contain hydroxyl groups and/or amino groups and/or thiol groups and/or carboxyl groups. Compounds containing hydroxyl groups and/or amino groups are preferred. These chain-extenders and cross-linking agents generally contain from 2 to 8 (preferably from 2 to 4) isocyanate-reactive hydrogen atoms. Mixtures of different compounds containing at least two isocyanate-reactive hydrogen atoms and having a molecular weight of from 32 to 400 may also be used.

Examples of such low molecular weight isocyanate-reactive compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1, 3-propane diol, dibromobutene diol (U.S. Pat. No. 3,723,392), glycerol, trimethylol propane, 1,2,6-hexane triol, trimethylol ethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher polybutylene glycols having a molecular weight of up to 400, 4,4′-dihydroxy diphenyl propane, dihydroxy methyl hydroquinone, ethanolamine, diethanolamine, N-methyl diethanolamine, triethanolamine and 3-aminopropanol.

Other low molecular weight polyols suitable to the present invention are mixtures of hydroxy aldehydes and hydroxy ketones ("formose") which are formed in the auto-condensation of formaldehyde hydrate in the presence of metal compounds as catalysts and compounds capable of ene-diol formation as co-catalysts (German Offenlegungsschriften Nos. 2,639,084; 2,714,084; 2,714,104; 2,721,186; 2,738,154 and 2,738,512) or the polyhydric alcohols obtained therefrom ("formitol"). When these formoses are used in combination with aminoplast formers and/or phosphites (German Offenlegungsschriften Nos. 2,738,513 and 2,738,532) plastics having improved flame resistance are obtained. Solutions of polyisocyanate polyaddition products (particularly solutions of polyurethane ureas containing ionic groups) and/or solutions of polyhydrazodicarbonamides, in low molecular weight polyhydric alcohols may also be used as the polyol component of the present invention (German Offenlegungsschrift No. 2,638,759).

Aliphatic diamines suitable to the present invention are ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine") 2,4- and 2,6-hexahydrotolylene diamine and mixtures thereof, perhydro-2,4′- and -4,4′-diaminodiphenyl methane, p-xylylene diamine, bis-(3-aminopropyl)-methylamine, diaminoperhydroanthracenes (German Offenlegungsschrift No. 2,638,731) and cycloaliphatic triamines (German Offenlegungsschrift No. 2,614,244). Hydrazine, substituted hydrazines (for example methyl hydrazine, N,N′-dimethyl hydrazine and homologues thereof) and acid dihydrazides may also be used. Examples of suitable acid dihydrazides are carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Semicarbazido alkylene hydrazides (such as β-semicarbazido propionic acid hydrazide (German Offenlegungsschrift No. 1,770,591)), semicarbazido alkylene carbazinic esters (such as 2-semicarbazido ethyl carbazinic ester (German Offenlegungsschrift No. 1,918,504)), and amino-semicarbazide compounds (such as β-aminoethyl semicarbizido carbonate (German Offenlegungsschrift No. 1,902,931), are also suitable to the present invention. The amino groups in these compounds may be completely or partially blocked by aldimine or ketimine groups (U.S. Pat. No. 3,734,894; German Offenlegungsschrift No. 2,637,115) to control the reactivity of the amino groups.

Examples of suitable aromatic diamines include: bis-anthranilic acid esters according to German Offenlegungsschriften Nos. 2,040,644 and 2,160,590; 3,5- and 2,4-diaminobenzoic acid esters according to German Offenlegungsschrift No. 2,025,900; the diamines containing ester groups described in German Offenlegungsschriften Nos. 1,803,635 (U.S. Pat. Nos. 3,681,290 and 3,736,350); 2,040,650 and 2,160,589; the diamines containing ether groups prepared according to German Offenlegungsschriften Nos. 1,770,525 and 1,809,172 (U.S. Pat. Nos. 3,654,364 and 3,736,295); 2-halogen-1,3-phenylene diamines optionally substituted in the 5-position (German Offenlegungsschriften Nos. 2,011,722; 2,025,896 and 2,065,869); 3,3′-dichloro-4,4′-diaminodiphenyl methane; tolylene diamine; 4,4′-diaminodiphenyl methane; 4,4′-diaminodiphenyl disulfides (German Offenlegungsschrift No. 2,404,976); diaminodiphenyl dithio ethers (German Offenlegungsschrift No. 2,509,404); aromatic diamines substituted by alkylthio groups (German Offenlegungsschrift No. 2,638,760); diaminobenzene phosphonic acid esters (German Offenlegungsschrift No. 2,459,491); aromatic diamines containing sulfonate or carboxylate groups (German Offenlegungsschrift No. 2,720,166); and the high-melting diamines described in German Offenlegungsschrift No. 2,635,400. The aminoalkyl thio-anilines described in German Offenlegungsschrift No. 2,734,574 exemplify aliphatic-aromatic diamines which may be used in the present invention.

Other chain-extenders which may be used in the present invention are 1-mercapto-3-aminopropane; optionally substituted amino acids such as glycine, alanine, valine, serine and lysine; and optionally substituted dicarboxylic acids such as succinic acid, adipic acid, phthalic acid, 4-hydroxy phthalic acid and 4-aminophthalic acid.

Other low molecular weight polyols having a molecular weight of up to 400 which may be used in accordance with the present invention are ester diols, diol urethanes and diolureas. Suitable ester diols correspond to the general formulae:

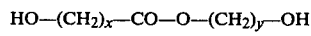

$$HO-(CH_2)_x-CO-O-(CH_2)_y-OH$$

and

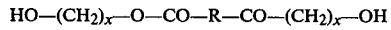

$$HO-(CH_2)_x-O-CO-R-CO-(CH_2)_x-OH$$

wherein

R represents an alkylene radical containing from 1 to 10, (preferably from 2 to 6) carbon atoms or a cycloalkylene or arylene radical containing from 6 to 10 carbon atoms;

x represents 2 to 6; and y represents 3 to 5.

Examples of compounds corresponding to these formulae are δ-hydroxybutyl-ε-hydroxycaproic acid ester, ω-hydroxyhexyl-γ-hydroxybutyric acid ester, adipic acid-bis-(β-hydroxyethyl)-ester and terephthalic acid-bis-(β-hydroxyethyl)-ester.

Diol urethanes which may be used in the present invention correspond to the general formula:

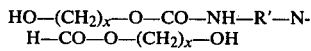

$$HO-(CH_2)_x-O-CO-NH-R'-NH-CO-O-(CH_2)_x-OH$$

wherein

R′ represents an alkylene radical containing from 2 to 15 preferably from 2 to 6 carbon atoms or a cycloalkylene or arylene radical containing from 6 to 15 carbon atoms, and x represents a number of from 2 to 6.

Examples of such diol urethanes are 1,6-hexamethylene-bis-(β-hydroxyethyl urethane) and 4,4′-diphenyl methane-bis-(δ-hydroxybutyl urethane). Diol ureas suitable to the present invention correspond to the general formula:

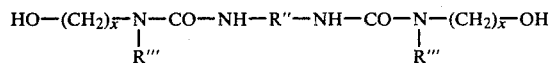

wherein

R" represents an alkylene radical containing from 2 to 15 (preferably from 2 to 9) carbon atoms or a cycloalkylene or arylene radical containing from 6 to 15 carbon atoms;

R''' represents hydrogen or a methyl group, and x represents the number 2 or 3.

Examples of such diol ureas are 4,4'-diphenyl methane-bis-(β-hydroxylethyl urea) and the compound:

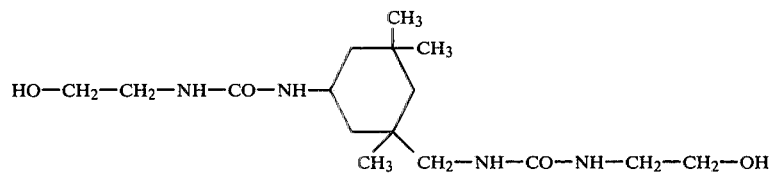

For certain purposes, it may be advantageous to use polyols containing sulfonate and/or phosphonate groups (German Offenlegungsschrift No. 2,719,372), such as the adduct of bisulfite with 1,4-butene diol or the alkoxylation products thereof.

In addition to the above-described materials, isocyanate-reactive monofunctional compounds may be used as "chain-terminators" in amounts of from 0.01 to 10% by weight (based on polyurethane solids). Such monofunctional compounds include monoamines and monohydric alcohols. Suitable monoamines include butyl- and dibutylamine, octylamine, stearylamine, N-methyl stearylamine, pyrrolidine, piperidine and cyclohexylamine. Appropriate monohydric alcohols are butanol, 2-ethyl hexanol, octanol, dodecanol, the various amyl alcohols, cyclohexanol and ethylene glycol monoethyl ether.

Optional additives and auxiliaries which may be employed in the present invention include blowing agents, catalysts, surface-active additives, reaction retarders, pigments and flame-proofing agents. Suitable blowing agents include water and/or readily volatile inorganic or organic substances. Appropriate organic blowing agents are acetone; ethyl acetate; halogen-substituted alkanes, such as methylene chloride, chloroform, ethylidene chloride, vinylidene chloride, monofluorotrichloromethane, chlorodifluoromethane, dichlorodifluoromethane; and butane, hexane, heptane or diethyl ethers. Inorganic blowing agents which may be used are air, $CO_2$ and $N_2O$. A blowing effect may also be achieved by adding compounds which decompose at the reaction temperature to give off a gas (e.g. nitrogen, given off by azo compounds, such as azodicarbonamide or azoisobutyronitrile). Other examples of blowing agents and information on the use of blowing agents may be found in Kunststoff-Handbuch, Vol. VII, by Vieweg and Hochtlen, Carl-Hanser-Verlag, Munich, 1966, for example on pages 108 and 109, 453 to 455 and 507 to 510.

Catalysts known to those in the art may also be used in the practice of the present invention. Among these catalysts are tertiary amines such as triethylamine; tributylamine; N-methyl morpholine; morpholine; N,N,N',N'-tetramethyl ethylene diamine; pentamethyl diethylene triamine and higher homologues (German Offenlegungsschriften Nos. 2,624,527 and 2,624,528); 1,4-diazabicyclo-(2,2,2)-octane; N-methyl-N'-dimethylaminoethyl piperidine; bis(dimethylaminoalkyl) piperazines (German Offenlegungsschrift No. 2,636,787); N,N-dimethyl benzylamine; N,N-dimethyl cyclohexylamine; N,N-diethyl benzylamine; bis(N,N-diethylaminoethyl)-adipate; N,N,N',N'-tetramethyl-1-3-butane diamine; N,N-dimethyl-β-phenyl ethylamine; 1,2-dimethylimidazole; 2-methyl imidazole; monocyclic and bicyclic amidines (German Offenlegungsschrift No. 1,720,633); bis-(dialkylamino)-alkyl ethers (U.S. 3,330,782, German Auslegeschrift No. 1,030,558, German Offenlegungsschriften Nos. 1,804,361 and 2,618,280); and tertiary amines containing amide groups (preferably formamide groups) according to German Offenlegungsschriften Nos. 2,523,633 and 2,732,292. Other suitable catalysts are also Mannich bases of secondary amines (such as dimethylamine), aldehydes (preferably formaldehyde), ketones (such as acetone, methylethyl ketone and cyclohexanone) and phenols (such as phenol, nonyl phenol or bisphenol).

Tertiary amines containing isocyanate-reactive hydrogen atoms suitable for use as catalysts are triethanolamine, triisopropanolamine, N-methyl diethanolamine, N-ethyl diethanolamine, N,N-dimethylethanolamine, the reaction products thereof with alkylene oxides (such as propylene oxide and/or ethylene oxide), and also secondary-tertiary amines according to German Offenlegungsschrift No. 2,732,292.

Other suitable addition catalysts are sila-amines containing carbon-silicon bonds, of the type described in German Pat. No. 1,229,290 (corresponding to U.S. Pat. No. 3,620,984). Examples of these compounds are 2,2,4-trimethyl-2-silamorpholine and 1,3-diethylaminomethyl tetramethyl disiloxane.

Other catalysts which may be used in the present invention include: nitrogen-containing bases (such as tetraalkyl ammonium hydroxides), alkali metal hydroxides, (such as sodium hydroxide), alkali metal phenolates (such as sodium phenolate) and alkali metal alcoholates (such as sodium methylate). Hexahydrotriazines may also be used as catalysts (German Offenlegungsschrift No. 1,769,043).

The reaction between NCO-groups and Zerewitinoff active hydrogen atoms may also be greatly accelerated by use of lactams and azalactams which are believed to form a complex with the compound containing acid hydrogen. Such complexes and their catalytic effect are described in German Offenlegungsschrift Nos. 2,062,288; 2,062,289; 2,117,576 (U.S. Pat. No. 3,758,444); 2,129,198; 2,330,175 and 2,330,211.

Organometallic compounds, particularly organo-tin compounds may also be used as catalysts in the present invention. In addition to sulfur-containing compounds, such as di-n-octyl tin mercaptide (German Auslegeschrift No. 1,769,367; U.S. Pat. No. 3,654,927), preferred organo-tin compounds are tin (II) salts of carboxylic acids, such as tin (II) acetate, tin (II) octoate, tin (II) ethyl hexoate and tin (II) laurate; and tin (IV) compounds, for example, dibutyl tin oxide, dibutyl tin dichloride, dibutyl tin diacetate, dibutyl tin dilaurate, dibutyl tin maleate and dioctyl tin diacetate.

The above-mentioned catalysts may also be used in the form of mixtures. Combinations of organometallic compounds and amidines, aminopyridines or hydrazino pyridines (German Offenlegungsschriften Nos. 2,434,185; 2,601,082 and 2,603,834) are particularly advantageous.

Additional catalysts which may be used in accordance with the present invention may be found in Kunststoff-Handbuch by Vieweg and Hochtlen, Vol. VII, Carl-Hanser-Verlag, Munich 1966, for example on pages 96 to 102. These additional catalysts are generally used in a quantity of from about 0.001 to 10% by weight, (based on the total quantity of compounds containing at least two isocyanate-reactive hydrogen atoms).

Surface-active additives which may be employed in the present invention include emulsifiers and foam stabilizers. Suitable emulsifiers are the sodium salts of castor oil sulfonates and salts of fatty acids with amines, such as diethylamine oleate and diethanolamine stearate. Alkali metal or ammonium salts of sulfonic acids (such as dodecyl benzene sulfonic acid or dinaphthyl methane disulfonic acid), of fatty acids (such as ricinoleic acid) and of polymeric fatty acids may also be used as surface-active additives.

Suitable foam stabilizers are polyether siloxanes, particularly water-soluble types. The structure of these compounds is generally such that a copolymer of ethylene oxide and propylene oxide is attached to a polydimethyl siloxane residue. Such foam stabilizers are described in U.S. Pat. No. 2,834,748; 2,917,480 and 3,629,308. In many cases, polysiloxane-polyoxyalkylene copolymers branched through allophanate groups (German Offenlegungsschrift No. 2,558,523) are particularly advantageous.

Reaction retarders (e.g. acid-reacting substances such as hydrochloric acid or organic acid halides) cell regulators (such as paraffins or fatty alcohols or dimethyl polysiloxanes), pigments, dyes, known flameproofing agents (for example tris-chloroethyl phosphate, tricresyl phosphate or ammonium phosphate and polyphosphate), stabilizers against the effects of ageing and weather, plasticizers, fungistatic and bacteriostatic substances, and fillers (such as barium sulphate, kieselguhr, carbon black or whiting) may also be used in the practice of the present invention.

Additional examples of surface-active additives, foam stabilizers, cell regulators, reaction retarders, stabilizers, flameproofing agents, plasticizers, dyes, fillers, fungistatic and bacteriostatic substances which may optionally be used in the present invention and information on the way in which these additives may be used may be found in Kunststoff-Handbuch by Vieweg and Hochtlen, Vol. VII, Carl-Hanser-Verlag, Munich 1966 for example on pages 103 to 113.

The process of the present invention may be carried out by techniques well known to those in the art. These known methods include reacting the starting materials by the one-shot process, the prepolymer process or the semi-prepolymer process. Suitable apparatuses are described in U.S. Pat. No. 2,764,565. Particulars of processing machines may also be found in Kunststoff-Handbuch by Vieweg and Hochtlen, Vol. VII, Carl-Hanser-Verlag, Munich, 1966, for example on pages 121 to 205.

Foams may be made in accordance with the present invention by introducing the foamable reaction mixture into a closed mold. Suitable mold materials are metals (for example, aluminum) or plastics (for example epoxide resin). The foamable reaction mixture foams in the mold and forms the molding. In-mold foaming may be carried out in such a way that the molding has either a cellular structure at its surface, or a compact skin and a cellular core. The foamable reaction mixture may be introduced into the mold in such a quantity that the foam formed just fills the mold. However, it is also possible to introduce more foamable reaction mixture than is required to fill the interior of the mold with foam. This latter technique is known as "overcharging" and is described in U.S. Pat. No. 3,178,490 and 3,182,104. The product foams may be rigid, semi-rigid or flexible. The unit weights of the product foams range from 15 to about 1000 kg/m$^3$. In many cases known "external release agents", (such as silicone oils) are used for in-mold foaming. However, it is also possible to use so-called "internal release agents", optionally in admixture with external release agents, of the type described in German Offenlegungsschriften Nos. 2,121,670 and 2,307,589.

According to the present invention, it is also possible to produce cold-hardening foams (cf. British Pat. No. 1,162,517 and German Offenlegungsschrift No. 2,153,086). Foams may also be produced by block foaming or by the known laminator process. Non-cellular or cellular elastomers or even lacquer coatings may also be produced in accordance with the present invention.

The products of the present invention may be used as shoe soles, upholstery material, sound insulating materials, coating compositions, lacquers, packaging materials and mattresses.

Having thus described our invention, the following examples are given by way of illustration. All percentages given in these examples are percents by weight unless otherwise indicated.

EXAMPLES

The symbols used in the following examples have the following meanings:
$T_1$ = beginning of the blowing reaction
$T_2$ = end of the blowing reaction
$T_3$ = tack-free time
$T_4$ = hardening time.
The polyols used in the following examples were:
Polyol A = polypropylene oxide having a functionality of 2.8 and an OH number of 49 (molecular weight 3200), started with trimethylol propane and propylene glycol.
Polyol B = difunctional propylene glycol-started propylene oxide/ethylene oxide polyether polyol having an OH number of 28 and a molecular weight of 4000.
Polyol C = trifunctional, trimethylol propane-started propylene oxide/ethylene oxide polyether polyol having an OH number of 35 and a molecular weight of 4800.
Polyol D = trifunctional, trimethylol propane-started propylene oxide/ethylene oxide polyether polyol having an OH number of 27 and a molecular weight of 5600.
Polyol E = trimethylol propane-started polypropylene oxide having a functionality of 3, an OH number of 875 and a molecular weight of 290.

Polyol F=trimethylol propane- and propylene glycol-started propylene oxide/ethylene oxide polyether having a functionality of 2.78, an OH number of 42 and a molecular weight of 3700.

The following isocyanates were used:
Polyisocyanate A=a mixture of 80 parts by weight of 2,4-tolylene diisocyanate and 20 parts by weight of 2,6-tolylene diisocyanate having an NCO content of 48%.
Polyisocyanate B=a semi-prepolymer of 4,4'-diisocyanatodiphenyl methane and tripropylene glycol having an NCO content of 22.8%.
Polyisocyanate C=a semi-prepolymer of isophorone diisocyanate and trimethylol propane having an NCO of 28%.

EXAMPLE 1

80 g of polyol D, 7 g of ethylene glycol, 0.3 g of dibutyl tin dilaurate, 10 g of trifluorochloromethane and N-(2-hydroxyethyl)-2-methyltetrahydropyrimidine (in the amount given in Table 1) were carefully mixed for 30 seconds at room temperature using a high-speed stirrer. After stirring, 38.5 g of polyisocyanate C were added and the mixture was stirred for another 15 seconds. The mass was foamed in an open pack.

The following times (secs.) were measured:

| Time/mass of catalyst | 0.35 g | 0.7 g | 1.0 g | 1.5 g |
|---|---|---|---|---|
| $T_1$ | 50 ± 5 | 16 ± 3 | 14 ± 3 | 13 ± 3 |
| $T_4$ | >180 | >180 | 175 ± 10 | 115 ± 10 |

COMPARISON EXAMPLE

When the N-(2-hydroxyethyl)-2-methyltetrahydropyrimidine in the above formulation was replaced with 0.35 g of diazabicycloundecene, values of 25±3 and 90±5 secs. were obtained for $T_1$ and $T_4$, respectively.

EXAMPLE 2

80 g of polyol D, 4 g of ethylene glycol, 5 g of N-methyl diethanolamine, 0.35 g of dibutyl tin dilaurate, 0.7 g of N-(2-hydroxyethyl)-2-methyltetrahydropyrimidine, 10 g of trifluorochloromethane were carefully mixed for 30 seconds at room temperature using a high-speed stirrer. After this stirring, 37 g of a semi-prepolymer of isophorone diisocyanate and trimethylol propane (NCO number 28) were added and the mixture was then stirred for another 15 seconds. The mass was foamed in an open pack. $T_1$ was 35±3 seconds and $T_4$ was 90±5 seconds.

COMPARISON EXAMPLE

When the N-(2-hydroxyethyl)-2-methyltetrahydropyrimidine of Example 2 was replaced with 0.3 g of diazabicycloundecene, the following times were obtained:
$T_1 = 32 \pm 5$ seconds;
$T_4 = 165 \pm 10$ seconds.

EXAMPLE 3

This example demonstrates the influence of the metal co-catalyst.

3.1 80 g of polyol D, 7 g of ethylene glycol, 0.5 g of N-(2-hydroxyethyl)-2-methyltetrahydropyrimidine, 10 g of trifluorochloromethane, x g of metal co-catalyst (dibutyl tin dilaurate) and 38.5 g of isocyanate C were mixed in accordance with the procedure described in Example 1. The following times (secs.) were obtained:

| Time/Amount of dibutyl tin dilaurate | 0.45 g | 0.7 g | 1.0 g | 1.5 g |
|---|---|---|---|---|
| $T_1$ | 35 ± 3 | 35 ± 3 | 33 ± 3 | 25 |
| $T_3$ | 120 ± 5 | 105 ± 5 | 105 ± 5 | 103 ± 5 |
| $T_4$ | >240 | 240 ± 10 | 240 ± 10 | 240 ± 10 |

3.2 Lead dioctoate rather than dibutyl tin dilaurate was used as the metal co-catalyst in the composition of Example 3.1 The times measured were as follows:

| Time/Amount of lead dioctoate | 0.5 g | 1.0 g | 0.5 g |
|---|---|---|---|
| $T_1$ | 20 ± 3 | 15 ± 3 | 12 ± 3 |
| $T_3$ | 45 ± 5 | 40 ± 5 | 40 ± 5 |
| $T_4$ | 55 ± 5 | 45 ± 5 | 43 ± 5 |

EXAMPLE 4

123 g of polyol B, 35 g of polyol C, 175 g of ethylene glycol, 245 g of 1,4-butane diol, 0.21 g of water, 0.035 g of dibutyl tin dilaurate, 10 g of trifluorochloromethane, 0.52 g N-(2-hydroxyethyl)-2-methyltetrahydropyrimidine and 130 g of isocyanate B were mixed in accordance with the procedure described in Example 1. The following times (secs.) were measured:
$T_1 = 25 \pm 3$
$T_2 = 41 \pm 3$
$T_3 = 50 \pm 3$
$T_4 = 50 \pm 3$

COMPARISON EXAMPLE

The following times were measured when 0.52 g of triethylene diamine (Dabco $^{(R)}$) were used instead of the N-(2-hydroxyethyl)-2-methyltetrahydropyrimidine of Example 5:
$T_1 = 20 \pm 3$
$T_2 = 30 \pm 3$
$T_3 = 37 \pm 3$
$T_4 = 37 \pm 3$

EXAMPLE 5

The following formulations were prepared in accordance with the procedures described in Example 1.

| | Formulation | | |
|---|---|---|---|
| | A | B | C |
| Polyol A (g) | 100 | 100 | 100 |
| Water (g) | 3,0 | 4,5 | 4,0 |
| Stabilizer (Polysiloxane polyalkylen-glycol-blockcopolymer) (g) | 1.0 | 1.5 | 1.0 |
| Activator (g) | 0.2 | 0.12 | 0.15 |
| Tin dioctoate (g) | 0.25 | 0.25 | 0.3 |
| Isocyanate A (index) | 105 | 105 | 105 |

The times measured ($T_1$=cream time, $T_2$=gel time in secs.) are given in the following Table.

| Activator | Time | Formulation | | |
|---|---|---|---|---|
| | | A | B | C |
| N—(hydroxyethyl)-2-methyl- | $T_1$ | 122 | 106 | 75 |
| tetrahydropyrimidine | $T_2$ | 133 | 112 | 89 |
| Desmorapid® PS 207, | $T_1$ | 108 | 93 | 76 |
| a product of BAYER AG | $T_2$ | 114 | 102 | 86 |
| Desmorapid® PP, | $T_1$ | 112 | 104 | 83 |
| a product of BAYER AG | $T_2$ | 120 | 118 | 95 |
| Dabco® | $T_1$ | — | 91 | — |
| | $T_2$ | — | 106 | — |

EXAMPLE 6

The following formulations were prepared in accordance with the procedure described in Example 1.

| | Formulation | | | |
|---|---|---|---|---|
| | A | B | C | D |
| Polyol A | 100 | 100 | 100 | 100 |
| Water | 3,0 | 4,5 | 4,0 | 4,0 |
| Stabilizer | | | | |
| (acc. to example 6) (g) | 1,5 | 1,0 | 0.8 | 1.0 |
| Activator | 0.2 | 0.12 | 0.12 | 0.15 |
| Tin dioctoate | 0.25 | 0.25 | 0.21 | 0.3 |
| Isocyanate A (index) | 105 | 105 | 105 | 105 |

The times measured ($T_1$ = cream time, $T_2$ = gel time in secs.) are given in the following Table.

| Activator | Time | Formulation | | | |
|---|---|---|---|---|---|
| | | A | B | C | D |
| 2-phenylimino-3- | $T_1$ | 162 | 114 | 115 | 118 |
| (2-hydroxyethyl)- | $T_2$ | 174 | 132 | 125 | 130 |
| oxazolidine | | | | | |
| Dabco® | $T_1$ | 98 | 85 | 80 | 79 |
| | $T_2$ | 108 | 95 | 90 | 88 |
| Desmorapid® PS 207 | $T_1$ | 118 | 95 | 89 | 87 |
| a product of BAYER AG | $T_2$ | 187 | 108 | 97 | 96 |
| Desmorapid® PP | $T_1$ | 187 | 122 | 95 | 98 |
| a product of BAYER AG | $T_2$ | 139 | 137 | 103 | 108 |

EXAMPLE 7

68.8 g of polyol E, 30 g of polyol F, amine catalysts (in the amounts given in the Table below), 3,5 g of oleic acid, 0,4 g of emulsifier (Levapon OL of Bayer AG, Germany), 10 g of trifluorochloromethane and 209 g of isocyanate B were mixed in accordance with the procedure described in Example 1. The times measured ($T_1$ = cream time, $T_2$ = gel time in secs.) are given in the Table below.

| Catalyst | $T_1$ | $T_2$ |
|---|---|---|
| 1 g of 2-phenylimino-3-(2-hydroxyethyl)-oxazolidine | 135 | 146 |
| 3 g of 2-phenylimino-3-(2-hydroxyethyl)-oxazolidine | 85 | 103 |
| 1 g of N—(2-hydroxyethyl)-imidazoline | 86 | 108 |
| 0.7 g of tetramethyl-guanidine (for comparison) | 15 | 25 |

What is claimed is:

1. A process for the production of a polyurethane comprising reacting a polyisocyanate and a compound having at least two isocyanate-reactive hydrogen atoms and a molecular weight of from 400 to 10,000 in the presence of a catalyst wherein the catalyst is a compound corresponding to the general formula:

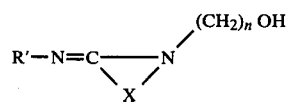

wherein
R' represents hydrogen, $C_1$–$C_{12}$ alkyl or $C_6$–$C_{10}$ aryl groups;
n represents an integer of from 1 to 6; and
X represents a divalent radical.

2. A process for the production of a polyurethane comprising reacting a polyisocyanate and a compound having at least two isocyanate-reactive hydrogen atoms and a molecular weight of from 400 to 10,000 in the presence of a catalyst wherein the catalyst corresponds to the general formula:

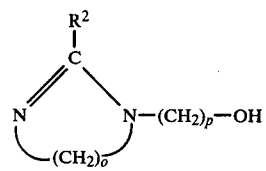

in which
$R^2$ represents hydrogen, $C_1$–$C_{12}$ alkyl or $C_6$–$C_{10}$ aryl groups and o and p each independently represent an integer of from 1 to 6.

3. A process for the production of a polyurethane comprising reacting a polyisocyanate and a compound having at least two isocyanate-reactive hydrogen atoms and a molecular weight of from 400 to 10,000 in the presence of a catalyst wherein the catalyst corresponds to the general formula:

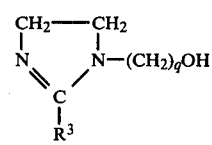

in which
$R^3$ represents hydrogen, $C_1$–$C_{12}$ alkyl or $C_6$–$C_{10}$ aryl groups and
q represents an integer of from 1 to 6.

4. The process of claim 1 or 2 or 3 wherein a compound containing at least two isocyanate-reactive hydrogen atoms and having a molecular weight of from 32 to 400 is used as a chain-extending agent.

5. The process of claim 1 or 2 or 3 wherein a blowing agent is used.

6. The process of claim 1 wherein the X component of the general formula represents the group:

—(O)$_z$—(CH$_2$)$_m$ wherein m represents an integer of from 2 to 6; and z represents 0 or 1.

7. The process of claim 6 wherein the catalyst is 2-phenyl-imino-3(2-hydroxyethyl)-oxazalodine which corresponds to the formula:

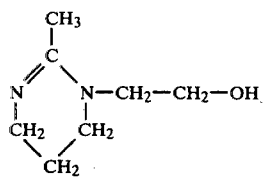

8. The process of claim 2 wherein the catalyst is N-(2-hydroxyethyl)-2-methyl-tetrahydropyrimidine which corresponds to the formula:

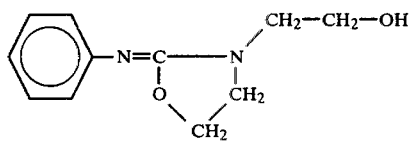

9. The process of claim 3 wherein the catalyst is N-(2-hydroxyethyl)-imidazoline which corresponds to the formula:

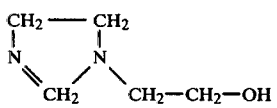

10. The process of claim 1 or 2 or 3 wherein the catalyst is used in quantities of from 0.001 to 5% by weight, based on the compound containing at least two active hydrogen atoms and having a molecular weight of from 400 to 10,000.

* * * * *